(12) United States Patent
Jamshidi (10) Patent No.: US 7,647,057 B2
(45) Date of Patent: Jan. 12, 2010

(54) SYSTEM AND METHOD FOR BROKERING MOBILE SERVICE PROVIDERS

(76) Inventor: Shahryar Jamshidi, 2802 Meridian Ave., San Jose, CA (US) 95150

( * ) Notice: Subject to any disclaimer, the term of this patent is extended or adjusted under 35 U.S.C. 154(b) by 213 days.

(21) Appl. No.: 12/031,264

(22) Filed: Feb. 14, 2008

(65) Prior Publication Data

US 2009/0143077 A1 Jun. 4, 2009

Related U.S. Application Data

(63) Continuation-in-part of application No. 11/347,751, filed on Feb. 3, 2006.

(51) Int. Cl.
*H04Q 7/20* (2006.01)
(52) U.S. Cl. .............. 455/456.3; 455/414.1; 455/456.6; 701/33; 705/1
(58) Field of Classification Search .............. 455/456.3, 455/414.1, 456.6; 701/33; 705/1
See application file for complete search history.

(56) References Cited

U.S. PATENT DOCUMENTS

| 6,549,625 | B1 * | 4/2003 | Rautila et al. ............... 380/258 |
| 2003/0087648 | A1 * | 5/2003 | Mezhvinsky et al. ......... 455/456 |
| 2004/0117195 | A1 * | 6/2004 | Bodin ........................... 705/1 |
| 2004/0203825 | A1 * | 10/2004 | Daniel et al. ............. 455/452.1 |
| 2006/0014531 | A1 * | 1/2006 | Nam et al. .................. 455/418 |
| 2006/0052921 | A1 * | 3/2006 | Bodin et al. .................. 701/33 |
| 2006/0135134 | A1 * | 6/2006 | Mezhvinsky et al. ..... 455/414.1 |

* cited by examiner

*Primary Examiner*—Danh C Le
(74) *Attorney, Agent, or Firm*—Foothill Law Group, LLP; Barton A. Smith; Howard E. Lebowitz (57) ABSTRACT

The present invention comprises a method and system for dispatching a plurality of mobile service providers among a plurality of users (stationary) based on proximity of a user to a particular mobile service provider. One or more representations of proximity will be presented to a user on a map by the system and the system computes offers based on proximity.

20 Claims, 14 Drawing Sheets

FIGURE 3
Basic Flow for MSP

ADD TIME PERIODS

Location: Primary Address (34220 aspen loop, union city, California, 94587) ← 42
Time Period: 9:00 AM to 5:00 PM ← 44
Dates: Single day on 12/7/2007 ← 46
Overwrite existing periods? ☐
[Submit]

CALENDAR

December 2007 ◄ Today ►

| Sunday | Monday | Tuesday | Wednesday | Thursday | Friday | Saturday |
|---|---|---|---|---|---|---|
| Nov 25<br>5-8 PM | Nov 26<br>5-8 PM | Nov 27<br>5-8 PM | Nov 28<br>5-8 PM | Nov 29<br>9 AM - 5 PM<br>5-8 PM | Nov 30<br>5-8 PM | 1<br>5-8 PM |
| 2<br>5-8 PM | 3<br>5-8 PM | 4<br>5-8 PM | 5<br>5-8 PM | 6<br>9 AM - 5 PM<br>5-8 PM | 7<br>9 AM - 5 PM | 8<br>5-8 PM |
| 9<br>5-8 PM | 10<br>5-8 PM | 11<br>5-8 PM | 12<br>5-8 PM | 13<br>9 AM - 5 PM<br>5-8 PM | 14<br>9 AM - 5 PM<br>5-8 PM | 15<br>5-8 PM |
| 16<br>5-8 PM | 17<br>9 AM - 5 PM<br>5-8 PM | 18<br>5-8 PM | 19<br>5-8 PM | 20<br>9 AM - 5 PM<br>5-8 PM | 21<br>9 AM - 5 PM | 22 |
| 23 | 24 | 25 | 26 | 27 | 28<br>9 AM - 5 PM | 29 |
| 30 | 31 | Jan 1 | Jan 2 | Jan 3 | Jan 4<br>9 AM - 5 PM | Jan 5 |

LOCATIONS

» Primary Address (34220 aspen loop, union city, California, 94587)
» fremont hub (38860 Fremont ave, fremont, ca 94536)
» redwood city hub (185 chestnut street, redwood city, ca, 94063)
» san jose hub (1869 Camden Ave, San jose, ca 95124)

FIGURE 9
Basic Work Flow For Customers

SYSTEM AND METHOD FOR BROKERING MOBILE SERVICE PROVIDERS

This application is a continuation-in-part of my application Ser. No. 11/347,751 filed on Feb. 3, 2006, which application is hereby incorporated by reference herein in its entirety.

BACKGROUND

1. Field of the Invention

The present invention relates to systems and methods for brokering the services of a plurality of mobile service providers among a plurality of stationary users based on the physical proximity of service providers to users. The methods comprise presenting proximity data of the service providers to the users as a function of time on maps and linked calendars. The methods further comprise offering services at a price based on the proximity and how soon the service is provided.

2. Description of the Related Art

U.S. Pat. No. 6,961,562 relates to location related services associated with mobile communications devices and, to a method and apparatus for acquiring, processing, using and brokering location related information associated with mobile communication devices operating on a wireless telecommunications network.

US 20050228719 pertains to electronic distribution of product or service promotion information to a mobile user are disclosed. A user may provide profile information to an online promotion service, such as user interests and preferences with respect to products and services as well as other information. The online promotion service may receive location information of point-of-sale facilities associated with particular promotions for products or services. The online promotion service may generate one or more targeted promotions to a mobile user when the user travels within a predetermined distance of an associated point-of-sale facility. A mobile user's location may be identified by a global positioning system and conveyed to the online promotion service. The user location information may be transmitted via a cell phone, a PDA, a pager or other device. This enables the user to take advantage of targeted or requested promotions while the user is within a close proximity to an associated point-of-sale facility.

US20050216337 pertains to electronic distribution of incentives having real-time consumer-based directions according to another embodiment of the present invention are disclosed. An online promotion service may receive user profile information, which may include demographic information, location information, user preferences, user requests, and other information. Online promotion service may provide targeted incentives and promotions to a particular user or class of users based on user profile information and other information. Incentives may include coupons, promotions, rebates, sales notifications, free samples, and other product or service related incentives. The patents mentioned above are hereby incorporated herein by reference.

SUMMARY OF THE INVENTION

The present invention comprises a method and system for dispatching a plurality of mobile service providers (MSP) among a plurality of customers (stationary) based on proximity of a user to a particular mobile service provider. Proximity may refer to the physical distance between the user and each mobile service provider or possibly to a more sophisticated proximity such a driving time over streets and highways, or a still more sophisticated method such as driving time taking into account current traffic conditions. One or more representations of proximity will be presented to a customer on a map representing a specific time, either the present time or some specified time in the future, with different measures of proximity indicated by color coding or other indicia. Proximity as a function of time is determined by spatial calendars. In one preferred embodiment, each MSP will have at least one spatial calendar indicating the location of at least some of his mobile resources as a function of time. A spatial calendar is a calendar on which every entry on the calendar is associated with a geographical location and is linked to a map. Each customer will have a single location calendar indicating his bookings as a function of time and location. In one preferred embodiment, customers may search for MSPs using a Spatial Search Engine. A Spatial Search Engine is the computer engine that searches for the location of MSPs of a particular type in a given time period and proximity of a customer location. A pricing structure will be presented based on some measure of proximity, for instance, in one preferred embodiment a lower rate for a more proximal customer is applied and same-day/next-in-line service is guaranteed. A profile of the service providers will be made available showing their capabilities, price, and business terms. Each MSP fills out its own Spatial Calendar and the customer uses the spatial search engine to find all or one of the MSPs that he desires and books them for a time and location that it best suits him. A customer chooses a service provider, enters his account information, enters a brief description of the service he needs, and makes a reservation. Service providers pick up the reservations and update the system server and estimate how long they will be occupied with the service call (at each service location). He updates the system server when he completes the work for a user. When the user accepts completion of the work, his account is charged for the service provider's fee. One embodiment of the method also allows for registration of MSP from the coverage area and verification of MSP credentials. The method also allows for pairing of journeymen with appropriate master craftsmen for sponsorship. A customer may also choose to make a reservation for a future date. In this case, the system must track the estimated location of Mobile Service Providers on the future dates using the MSPs spatial calendar and offer proximity discounts based on the future date's schedule.

A system for carrying out the method comprises a system server programmed to track the position of a plurality of Mobile Service Providers (MSP) on the current date and optionally future dates and display their position (proximity) to each of the users along with a profile of each MSP. In one preferred embodiment, the position of MSPs may be tracked by global positioning system. In one preferred embodiment position may be tracked by MSP text inputs onto spatial calendars. In still another preferred embodiment position is entered by reverse geocoding that is by entering positions by clicking the desired position on a map. The information is provided to users over an electronic network such as the public Internet via desktop computers, smart phones, laptop computers or equivalents thereof. The MSP's will have a means of contacting the system server, such as a mobile computing device, or verbally over the telephone. In one preferred embodiment the system also allows for automatic registration of MSPs from all over the coverage area with appropriate verification of the MSP's credentials with respect to the various licenses and master craftsman sponsorship (done over the Internet).

It is an object of the invention to provide a method and system for dispatching a plurality of Mobile Service Providers among a plurality of stationary users by displaying the proximity of Mobile Service providers to user.

It is a further object of the invention to offer customer pricing options for MSPs based on the proximity of the MSP to the customer.

It is a still further object of the invention to offer automatic registration of MSPs.

It is a still further object of the invention to pair up journeymen with appropriate master craftsmen.

It is a still further object of the invention to make the system available over a public electronic network such as the public internet.

These and other objects of the invention will be apparent from a detailed description and accompanying drawings which are provided by way of example and not limitation.

DETAILED DESCRIPTION OF THE PREFERRED EMBODIMENTS

The invention is now described more fully with reference to the accompanying drawings in which several preferred embodiments are shown. The invention may be embodied in many different forms and should not be construed to be limited to the preferred embodiments illustrated, but rather these embodiments are provided to fully convey the scope of the invention to those skilled in the art, and should be construed to be limited only by the scope of the appended claims.

Figure 1:
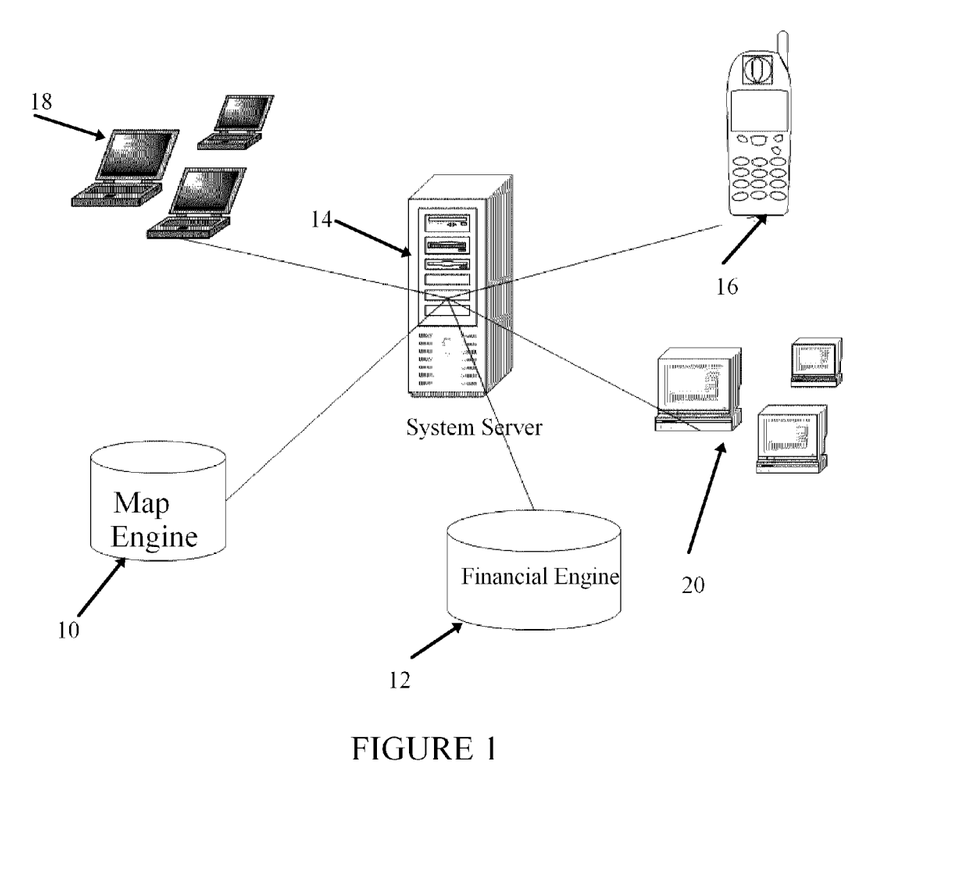
FIG. 1 is a schematic diagram of the system.

FIG. 1 shows a drawing of the configuration of one embodiment of the invention named Zoospi$^{SM}$. (a service mark of Zoospi.com, Inc). It comprises a map engine 10. A preferred map engine is the Google Map Database, which provides an Application Program Interface containing routines, protocols, and tools for seamless integration of Google maps into the application. It further comprises a financial engine 12 for collecting payments from customers. A preferred financial engine is the PayPal system. It further comprises a system server 14, the server comprising logic and resources for displaying a customer's portal, displaying an MSP Portal, tracking the position of the MSPs, computing the proximity of MSPs to stationary customer locations, preparing customized bids which depend on the proximity of an MSP to a stationary customer, and a customer booking process. While the system server is described as a single server in principal, those skilled in the art will appreciate that this description may encompass many physical servers, either located together or apart, so as to provide for volume of service provided, redundancy, and geographical distribution for quality of access. The system further comprises telephones 16, portable computers 18, and desktop computers 20 capable of communicating with the system server.

Figure 2:
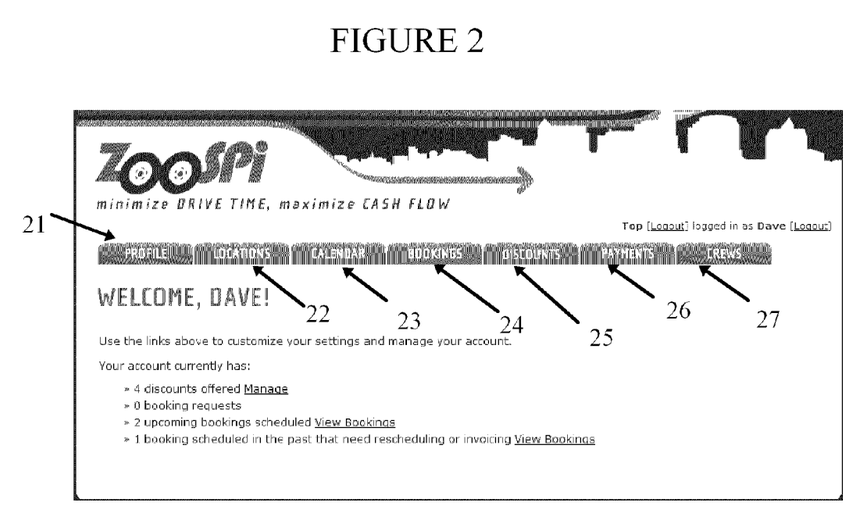
FIG. 2 is a screen shot of the MSP's portal.

FIG. 2 shows one embodiment of the MSP Portal comprising seven tabs, namely,

Profile 21: In this section MSP enters its profile, usually during the signup this section is filled out and it is mandatory. It may contain billing address, email address, cell phone numbers and a text field where the MSP can write up what ever else he would like the customer to know about him.

Locations 22: In this tab the MSP enters his frequently used locations, i.e. service hubs or potentially a notice for immediate availability.

Calendar 23: This is the Spatial Calendar that the MSP fills out explaining which parts of the city he is serving on which days and hours.

Bookings 24: This is the Spatial Calendar that the MSP fills in as he accepts booking requests.

Discounts 25: This is the section the MSP enters his proximity based discounts.

Payments 26: This is the section views his monthly statements

Crews 27: This is the section where the MSP can enter additional crews that work under his direction.

Figure 3:
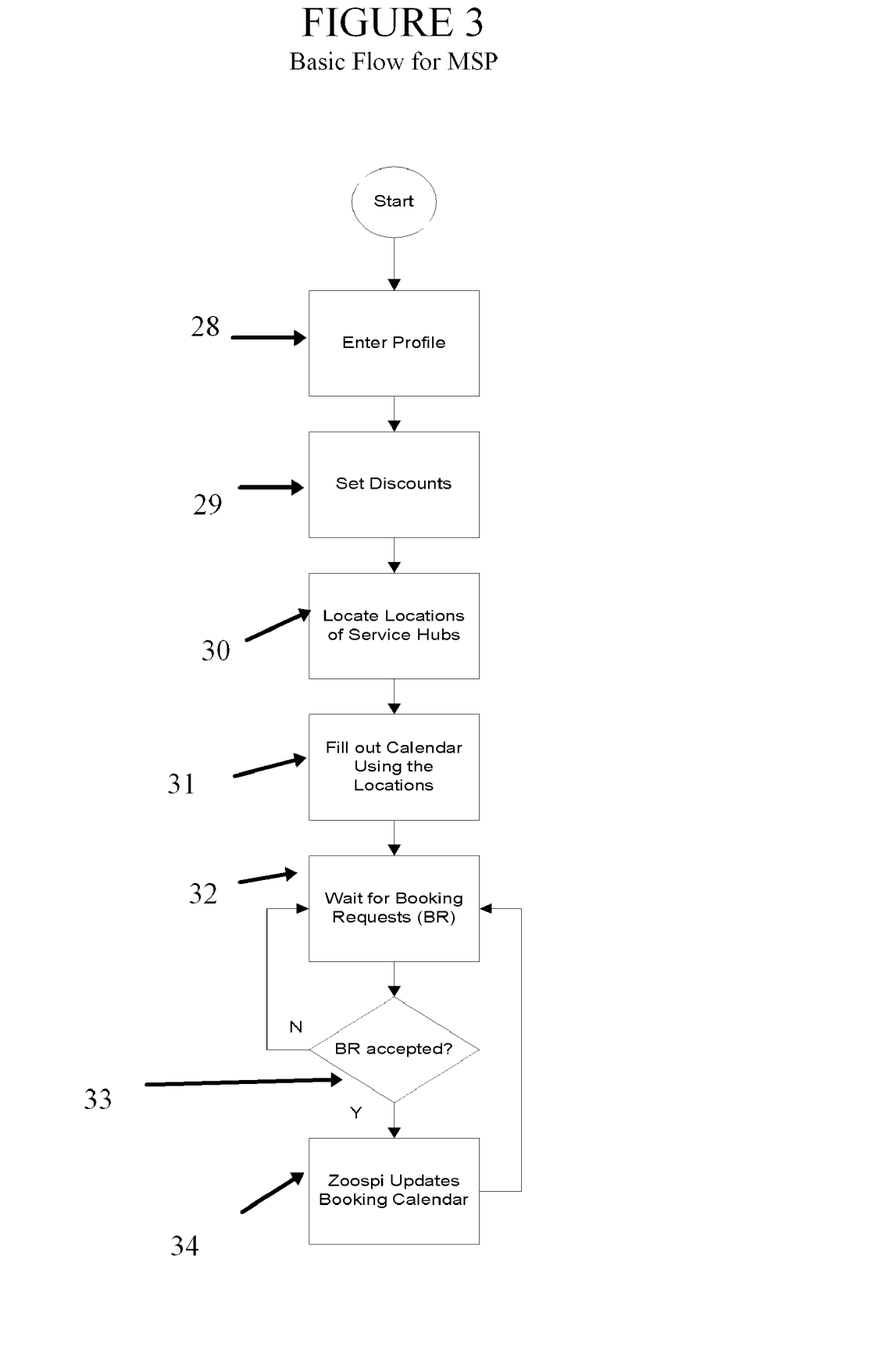
FIG. 3 is a flow diagram of the MSP's work flow.

FIG. 3 shows the basic flow diagram for MSPs using the MSP portal. In Block 28 the MSP enters his profile on tab 21 of the MSP portal. In Block 29 the MSP sets his proximity based discounts using tab 25 of the MSP portal. In Block 30 the MSP sets the locations of frequently used service hubs using tab 22. He may indicate the locations by entering the address or by reverse geocoding (indicating the locations with a cursor on a map). In Block 31 the MSP fills out a Spatial Calendar, indicating his availability at the locations, which were entered on tab 23, as a function of date and time. In Block 32 the MSP waits for booking requests from customers on tab 24. On Block 33, booking requests are accepted or not by the MSP. In Block 34, accepted bookings are entered in tab 24.

Figure 4:
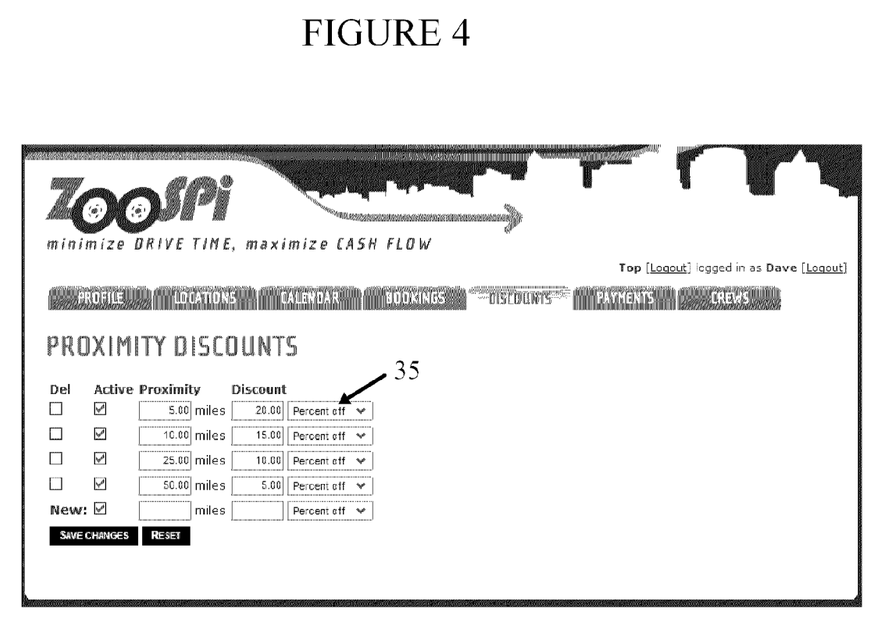
FIG. 4 is a screen shot of the discounts tab of the MSP's portal.

FIG. 4 shows the Discount tab of the MSP page. In one preferred embodiment, promotions are all proximity based. The idea is the MSPs pass the savings associated with shorter distance to the customer both at the present and in the future. The promotions can be by percentage off the bill or a dollar amount off the bill both options are available to the MSP via the pull down menu 35.

Figure 5:
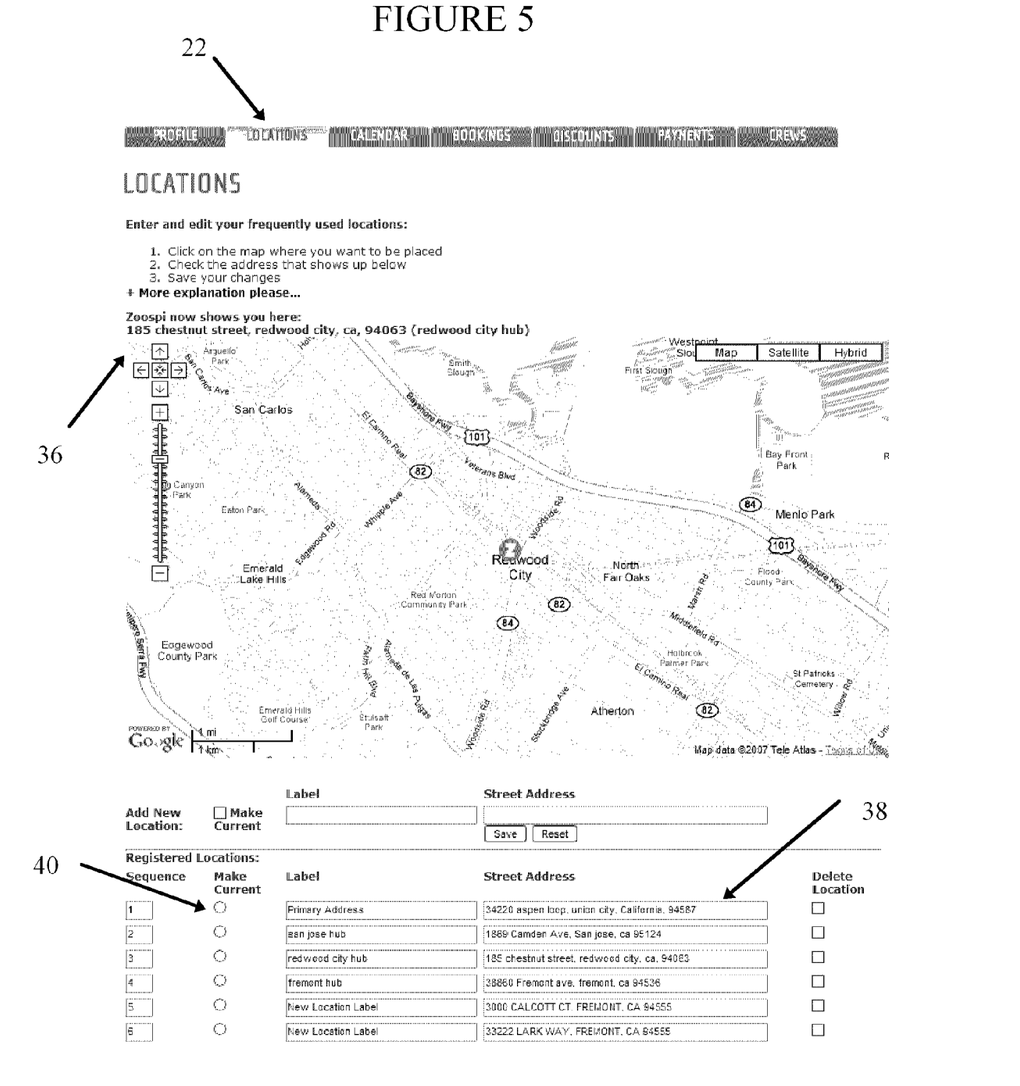
FIG. 5 is a screen shot of the Locations tab of the MSP portal.

FIG. 5 shows the Locations tab 22 of the MSP page. In one preferred embodiment, the MSP defines the locations for his service hubs in the locations tab. He may either do reverse geocoding by defining his location by clicking on the map 36, or entering the address of his service hub in the field provided 38. In one preferred embodiment, when an MSP is unemployed at one particular time he can select the "make current" button 40 for his location and he is placed on the map as immediately available, thus bypassing the spatial calendar. A flashing van will appear on the calendar for the duration he designates or until he accepts a booking from a customer.

Figure 6:
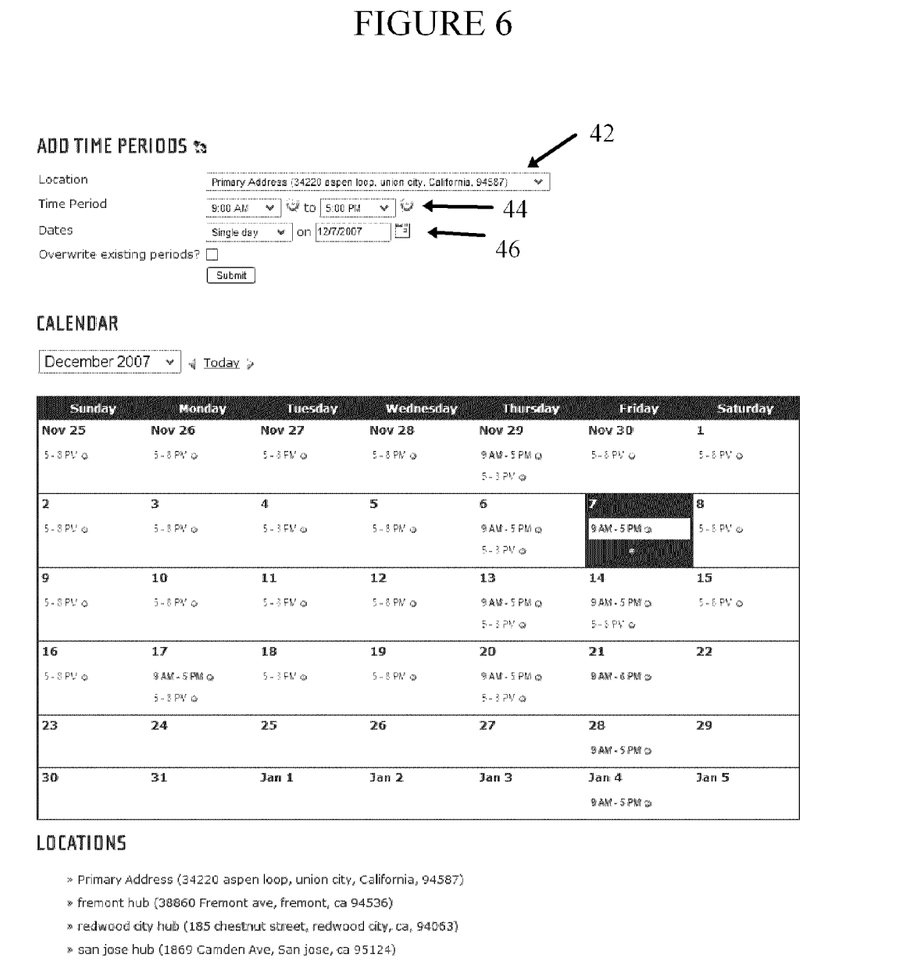
FIG. 6 is a screen shot of the Calendar tab of the MSP portal.

FIG. 6 shows the calendar tab 23 of the MSP portal. The Calendar is a Spatial Calendar where the MSP enters his predefined locations as well as the dates and times that he will be at those locations. All the locations are linked to a map. These locations are referred to as Virtual Hubs. The MSP places himself on the map by selecting locations from "locations pull down tab" 42 and "time period" 44 and "date" 46 for each location. These locations were those selected in the Locations tab 22 and are listed at the bottom of the page.

Figure 7:
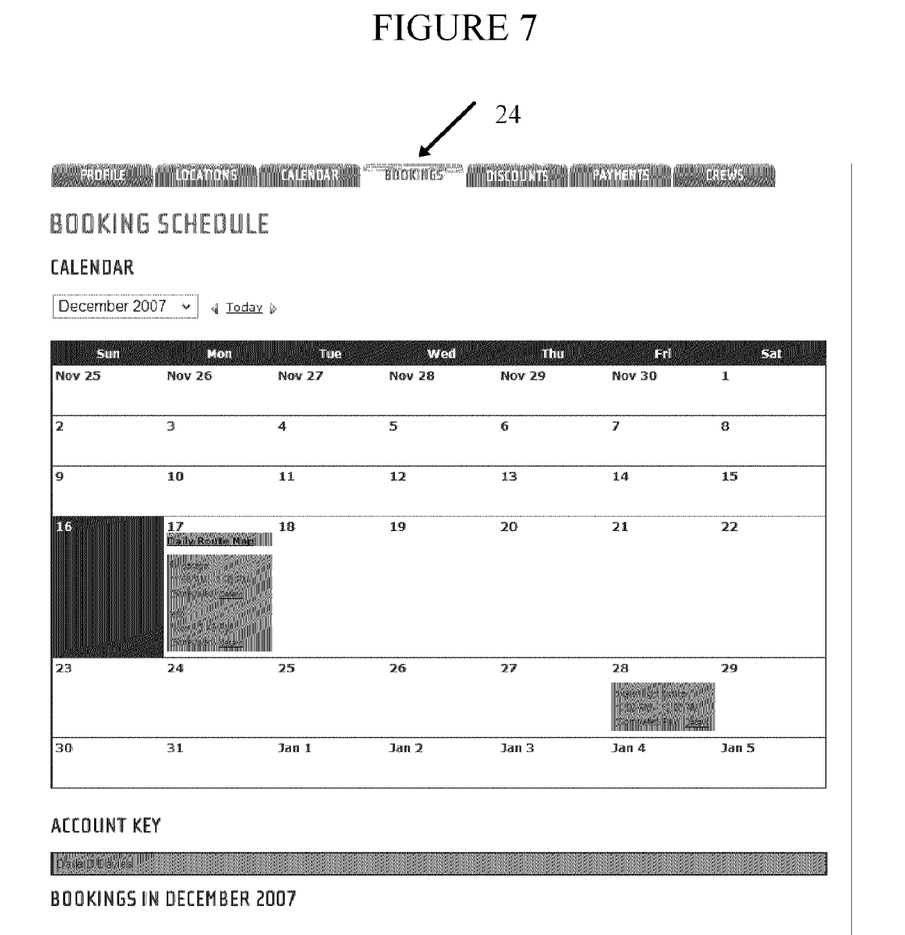
FIG. 7 is a screen shot of the Booking tab of the MSP portal.
Figure 8:
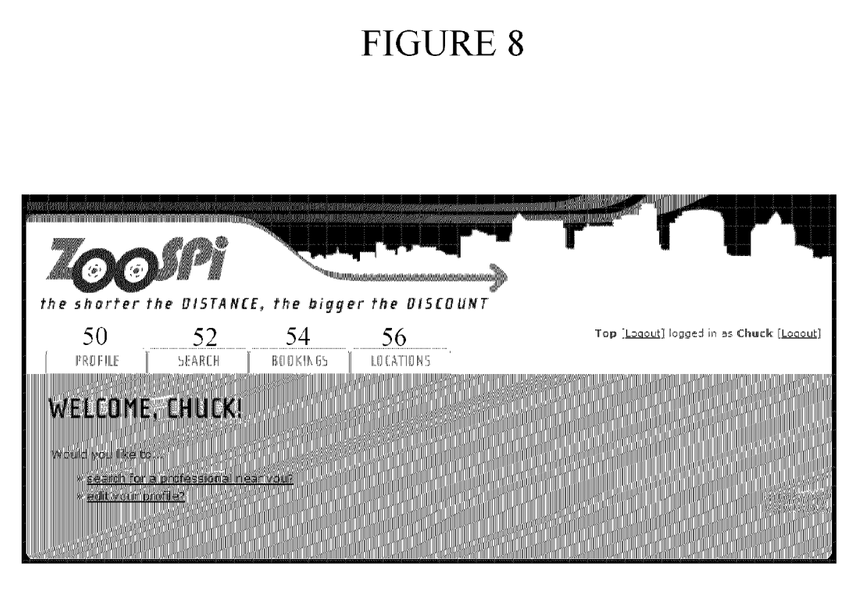
FIG. 8 is a screen shot of the Customer's portal.

FIG. 7 shows the bookings tab 24 of the MSP portal, Booking's Spatial Calendar. Once the MSP accepts a booking he is placed on the booking's spatial calendar and if the user searches for the MSP his bookings will appear as a van at those locations:

FIG. 8 shows the customer's portal, comprising four tabs as follows:

Profile 50: In this section Customer enters its profile, usually during the signup this section is filled out and it is mandatory from a legal perspective Locations 56: In this tab the Customer enters his locations other than his home, i.e. work, rental unit etc.

Bookings 54 This is the Calendar that Zoospi fills out when the Customer books an MSP upon the agreed time between the MSP and the customer.

Search 52 This tab is where the customer can use the Zoospi Spatial Search Engine to find all nearby MSPs.

Figure 9:
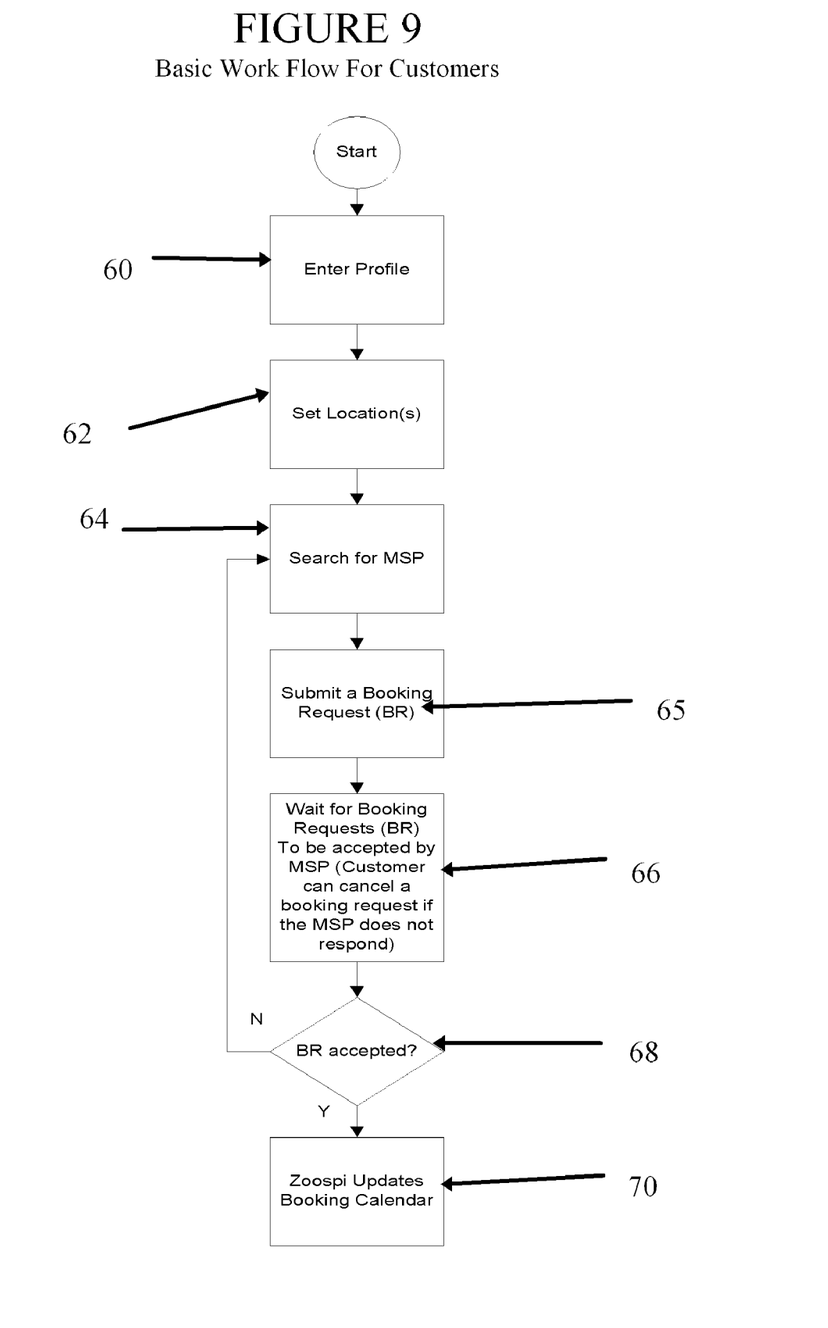
FIG. 9 is the basic work flow diagram for a customer.

FIG. 9 shows the work flow diagram for customers. The work flow comprises:

Entering Profile in block 60.

Entering locations to be serviced (e.g. residence, rental properties, vacation home) in block 62. Locations may be entered by inputting the address or reverse geo-coding.

Searching for MSPs using the Spatial Search Engine in block 64. Searching may be searched by type of MSP, proximity, date and time.

Submitting s booking request in block 65.

Confirming that the request has been accepted in blocks 66 and 68.

The Zoospi system entering accepted bookings on the Booking Calendar 70.

Figure 10:
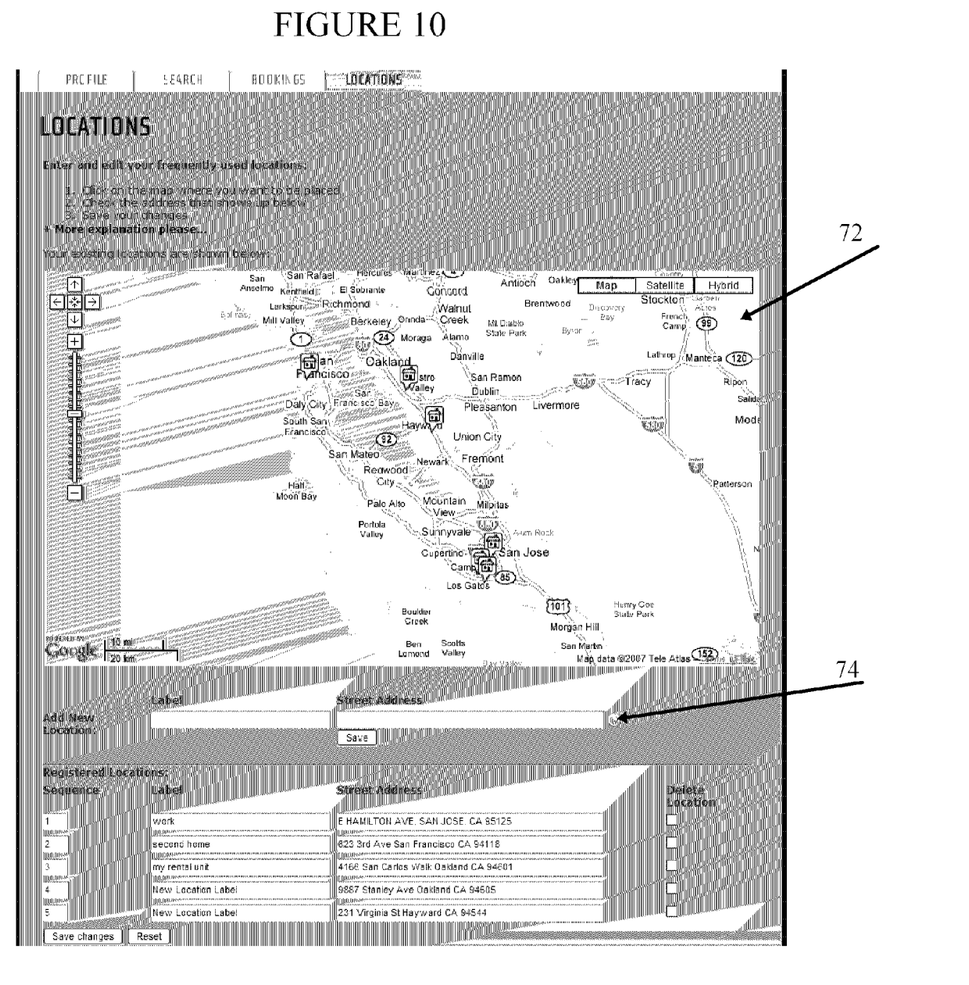
FIG. 10 is a screen shot of the Locations tab of the Customer's portal.

FIG. 10 shows the Locations Tab of the customer portal. Customers may enter their locations by clicking on the map 72 or entering new locations manually in space 74.

Figure 11:
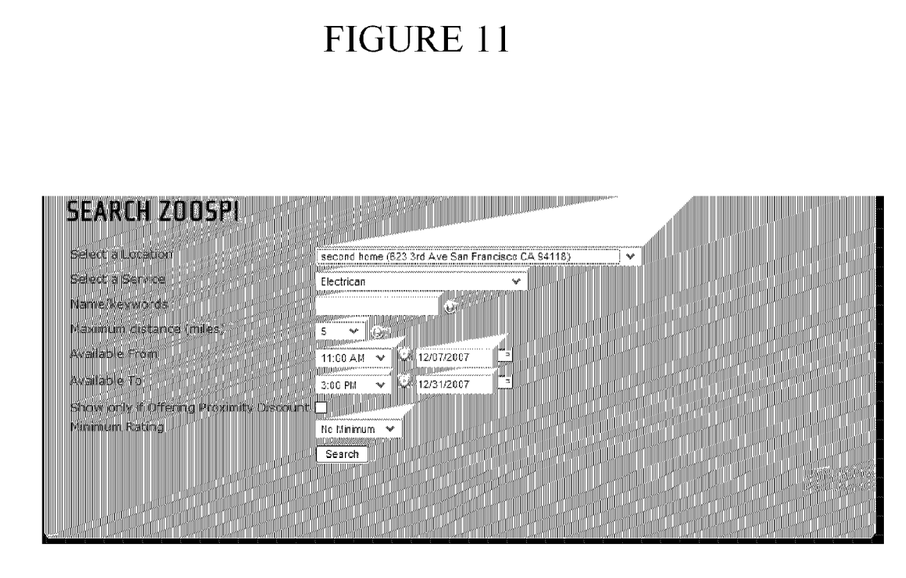
FIG. 11 is a screen shot of the spatial search engine.

FIG. 11 shows a preferred embodiment of a Spatial Search Engine which searches all of the locations that MSPs have placed on the map within a certain proximity of a point and at a time frame in which the customer has an interest. With this search engine the customer can find all of the MSPs that match his search criteria within the proximity of the location that he desires.

Figure 12:
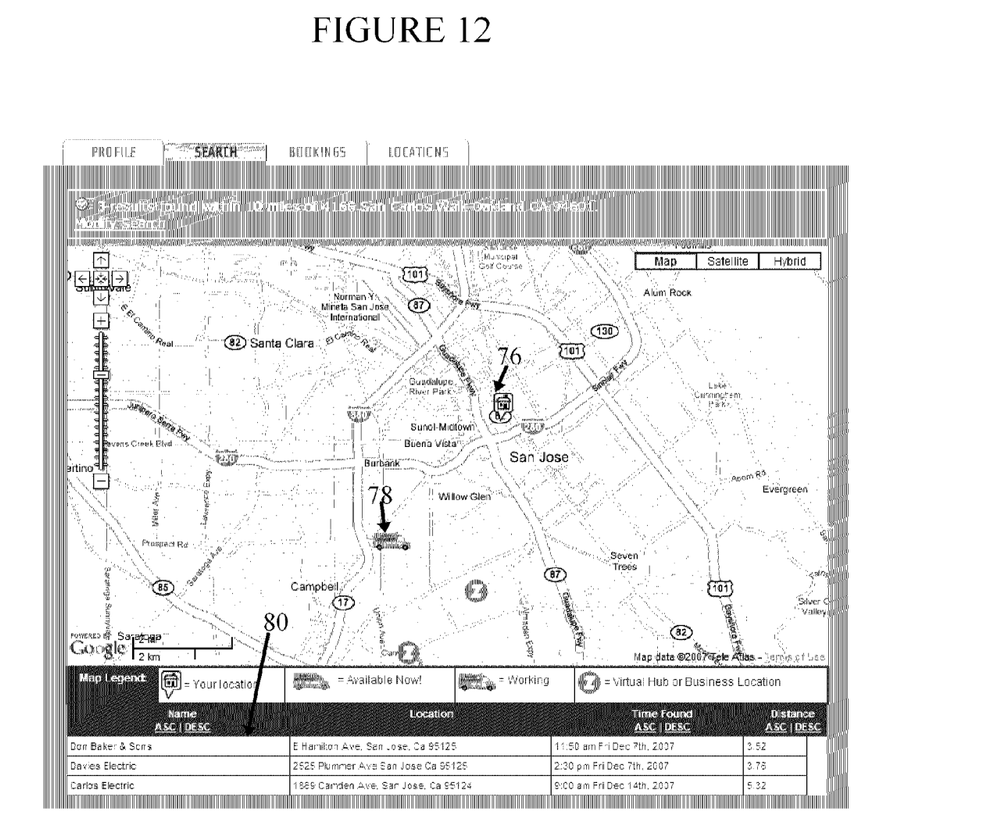
FIG. 12 is screen shot that shows the search results of a spatial search.

FIG. 12 shows the results of a search plotted on a map. The customer's location 76 is shown, as is a currently available MSP 78. The various MSPs that meet the customer's criteria 80 are listed at the bottom of the page.

Figure 13:
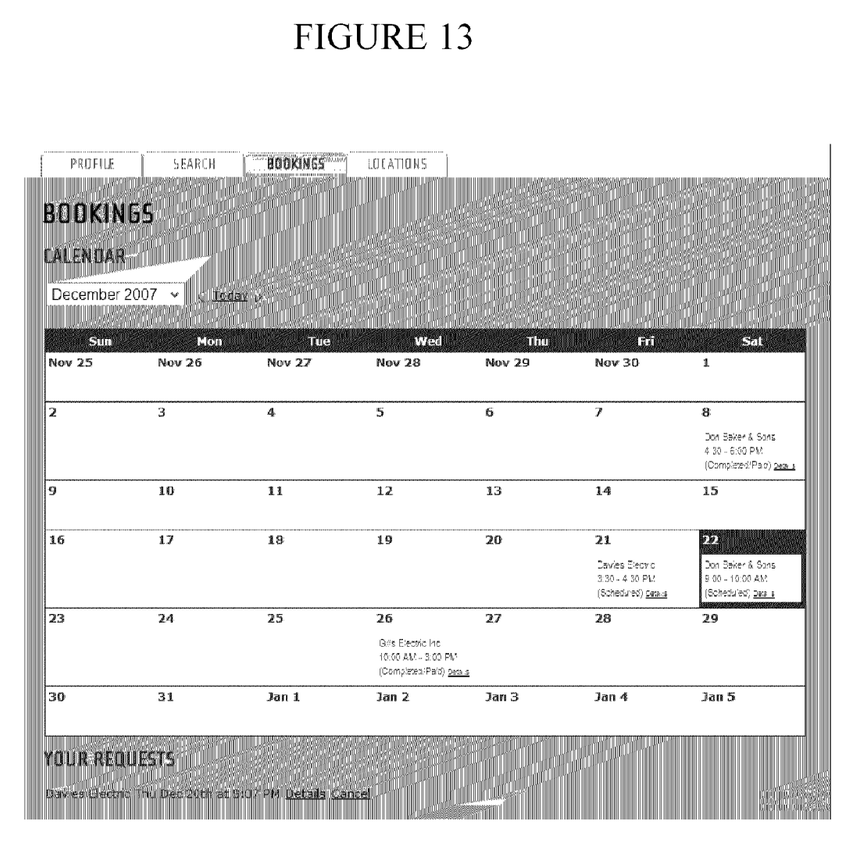
FIG. 13 is a screen shot that shows the Bookings tab of the Customer's portal.

FIG. 13 is a screen shot of the customer's bookings Calendar showing all of the Customer's bookings as a function of location and time.

Figure 14:
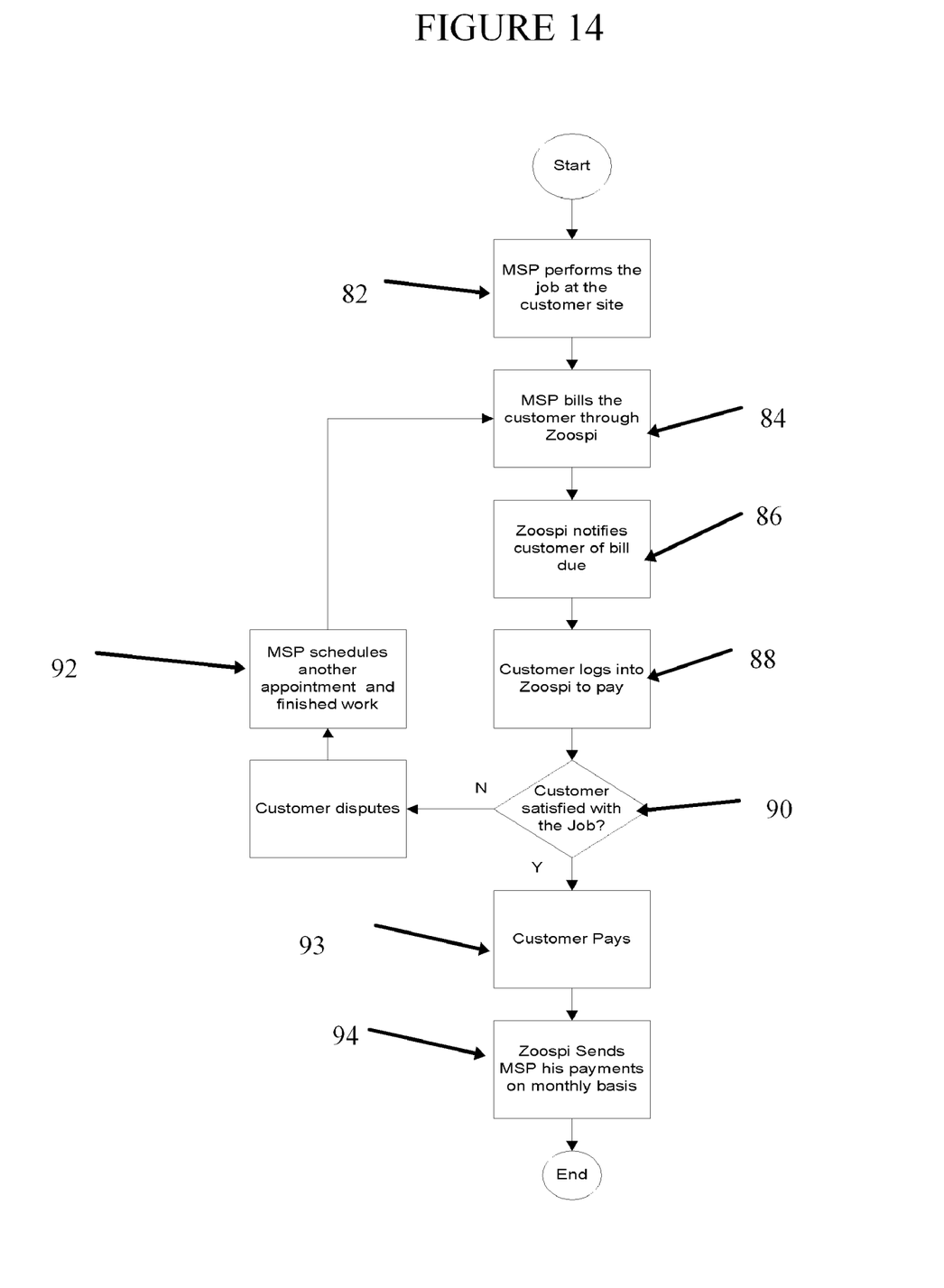
FIG. 14 is a work flow diagram showing financial settlement of a transaction.

Zoospi financial transaction are all done with a form which is used to accept and schedule a booking, transmit a quote, invoice, dispute and accept payment. This form can go back and forth between the MSP and customer as necessary until the customer is satisfied. A work flow diagram is shown on FIG. 14. In Block 82, the MSP performs the task at the customer's site. In Block 84 the MSP bills the customer though Zoospi. In Block 86 Zoospi notifies the customer. In Block 88, Customer logs on to get his bill. In Block 90, Customer either accepts or rejects the job. If Customer rejects the job another visit is scheduled 92 to correct the problem. If customer accepts the job he pays Zoospi 93, and Zoospi pays MSP on a monthly basis 94.

Some aspects of one preferred embodiment of the system are as follows:

1) A web portal for enrolling MSP's in the system,
2) A web portal for allowing a stationary user (customer) to enroll in the system and choose among MSP's in his vicinity based on proximity of the MSP on the date when service is to be provided.
3) Logic and resources for tracking the locations of the MSP's, computing their proximity to stationary customers and preparing bids which depends on the proximity of an MSP and a stationary customer,
4) A business help portal for pairing master craftsmen and journeyman craftsmen,
5) A MSP portal for updating the position of an MSP to the system, picking up a new order, or reporting completion of a job,
6) A customer booking process, wherein a customer can choose an MSP by proximity and can choose between same day and future day service.
7) A customer booking process, wherein a customer sets criteria for sorting the MSP's and only the MSP's which meet the criteria are displayed to the customer.
8) A customer booking process, wherein a customer enters a description of the service he needs.

I claim:

1. A method of dispatching a plurality of Mobile Service Providers among a plurality of stationary users, comprising the steps of:
   a) operating a system to interact with the Mobile Service Providers and stationary users over a public computer network,
   b) enrolling a plurality of Mobile Service Providers in the system,
   c) enrolling a plurality of stationary users in the system,
   d) tracking the position of at least some of the plurality of Mobile Service Providers as a function of date and time on spatial calendars, wherein each spatial calendar applies to one Mobile Service Provider and each position is linked to a map,
   e) allowing stationary users to perform an automated search of the spatial calendars to find Mobile Service Providers within a certain proximity,
   f) offering services to stationary users at a price related to the proximity of the Mobile Service Providers, and
   g) allowing customers to book services with Mobile Service Providers.

2. The method of claim 1, wherein tracking the position of at least some of the Mobile Service Providers comprises tracking the position on the current date and at least one future date on a spatial calendar.

3. The method of claim 2, wherein tracking the position of at least some of the Mobile Service Providers comprises allowing the Mobile Service Providers to input their current and planned future positions by inputting locations manually on a spatial calendar.

4. The method of claim 3, wherein tracking the position of at least some of the Mobile Service Providers comprises tracking the Mobile Service Providers with a global positioning system.

5. The method of claim 2, wherein proximity comprises ground distance.

6. The method of claim 2, wherein proximity comprises estimated travel time.

7. The method of claim 2, wherein proximity comprises estimated travel time taking into account local traffic conditions.

8. The method of claim 2, wherein offering services to stationary users comprises offering a lower price for services to be provided by more proximal Mobile Service Providers.

9. The method of claim 2, wherein the computer network comprises the public Internet.

10. The method of claim 2, wherein enrolling Mobile Service Providers comprises, pairing independent journeyman with sponsorship by appropriate master craftsman.

11. The method of claim 2, wherein enrolling Mobile Service Providers further comprises verifying credentials of the Mobile Service Providers.

12. The method of claim 2, further comprising accepting criteria from a stationary user and presenting the user only with those MSP's which meet the user's criteria.

13. A server programmed to perform the steps in claim 2.

14. A server programmed to perform the steps in claim 1.

15. A system for dispatching a plurality of Mobile Service Providers among a plurality of stationary users, comprising: a system server operating accessible on a public network, the system server comprising logic and resources to enroll a plurality of Mobile Service providers, to enroll a plurality of stationary users, to track the position of at least some of the Mobile Service Providers as a function of date and time on spatial calendars wherein a spatial calendar applies to one Mobile Service Provider and each position is linked to a map, to allow stationary users to perform automated searches of the spatial calendars to find Mobile Service Providers within a certain proximity, to offer services to stationary users based on their proximity to a Mobile Service Provider, and to allow customers to book services with Mobile Service Provider; a map engine; a financial engine; telephones and computers connected to the public network.

16. The system of claim 15 wherein the logic and resources to track the position of at least some of the Mobile Service Providers includes logic and resources to track at least some of the Mobile Service providers on the current day and at least one other day.

17. The system of claim 15, wherein the logic and resources further comprises logic and resources to accept a reservation from a stationary user, assign the reservation to a Mobile Service Provider and charge the user's account when the service has been provided.

18. The system of claim 15 wherein the public network is the Internet.

19. The system of claim 17 wherein the logic and resources to offer services to at least some stationary users comprises logic and resources to offer a lower price for services to be provided by a more proximal Mobile Service Provider.

20. The system of claim 17, further comprising logic and resources to accept criteria from a user and logic and resources to offer only those MSP's which meet the criterion.

* * * * *